United States Patent [19]

Lewis, Jr.

[11] Patent Number: 4,527,188
[45] Date of Patent: Jul. 2, 1985

[54] APPARATUS FOR DEMODULATING SAMPLED DATA CHROMA SIGNALS

[75] Inventor: Henry G. Lewis, Jr., Hamilton Square, N.J.

[73] Assignee: RCA Corporation, Princeton, N.J.

[21] Appl. No.: 467,432

[22] Filed: Feb. 17, 1983

[51] Int. Cl.$^3$ .............................................. H04N 9/50
[52] U.S. Cl. ..................................................... 358/23
[58] Field of Search ....................... 358/13, 23; 329/50

[56] References Cited

U.S. PATENT DOCUMENTS

| 3,946,432 | 3/1976 | Goldberg et al. | 358/13 |
| 4,333,104 | 6/1982 | Geller | 358/23 |
| 4,337,477 | 6/1982 | Sagishima et al. | 358/18 |
| 4,344,040 | 8/1982 | Reilly et al. | 329/50 |

Primary Examiner—Richard Murray
Attorney, Agent, or Firm—E. M. Whitacre; P. J. Rasmussen; E. P. Herrmann

[57] ABSTRACT

In processing color video signals in sampled data format, the sample rate is nominally far in excess of that required to process the baseband color signals. Thus, when the chrominance signal is demodulated only certain ones of the chrominance signal samples need to be demultiplexed from the data stream to reconstruct the color mixture signals. It is convenient to phase lock a clock to the data stream and select like samples from every sequence of samples. However, the NTSC video format provides a chrominance signal which has a 180 degree phase displacement from line-to-line. Thus, if like samples are selected from all lines, there will be a line-to-line spatial translation of image points on the displayed image giving rise to fine dot crawl along vertical edges of color transitions. The present invention includes a demodulator which demultiplexes sample points which are vertically aligned line-to-line and complements (inverts the polarity) of the samples on every other line. The sampling is effected by providing a sampling clock phase locked with burst and which undergoes a 180 degree phase displacement (relative to burst) responsive to horizontal sync signals.

12 Claims, 7 Drawing Figures

APPARATUS FOR DEMODULATING SAMPLED DATA CHROMA SIGNALS

BACKGROUND OF THE INVENTION

This invention relates to processing TV signals in the digital domain and more particularly to preventing/curing fine dot crawl along color transitions at vertical edges in displayed images.

The development of very large scale integrated (VLSI) circuits has made possible the processing of video signals in a TV receiver in the digital domain. As currently conceived, digital TV receivers will include an analog tuner and IF section since the RF signal frequency spectrum in these sections is too high for processing by current VLSI digital circuits. The IF video signal is detected and applied to an analog-to-digital (A/D) converter which generates a pulse code modulated (PCM) manifestation of the analog signal. In order to satisfy the Nyquist sampling criterion, and to phase lock the sampling clocks to the video signal, sampling is performed at some multiple of the color subcarrier frequency $F_{sc}$. A sampling rate of $3F_{sc}$ satisfies the criterion, however, to simplify some of the processing functions, it is more advantageous to sample at the rate of $4F_{sc}$.

The PCM composite signal is separated into luminance (Y) and chrominance (C) components which are separately processed and then combined in a matrix to produce red, green and blue (RGB) signals for application to the display kinescope. The chrominance signal is a phase and amplitude modulated signal comprising the linear sum of first and second carriers amplitude modulated with B-Y and R-Y signals, respectively, and wherein the first and second carriers have a 90 degree phase relationship. The R-Y and B-Y components of the chrominance signal are therefore in quadrature relationship. If the sampling rate of the A/D converter is at four times the chrominance subcarrier rate, the phase of the sampling points can be arranged so that successive PCM samples of the separated chrominance signal will contain only information of the respective color signals (B-Y) and (R-Y). That is, the successive samples of the separated chrominance signal will be interleaved in the form $+(B-Y)_n$, $+(R-Y)_n$, $-(B-Y)_n$, $-(R-Y)_n$, $+(B-Y)_{n+1}$, $+(R-Y)_{n+1}$, $-(B-Y)_{n+1}$, etc., where the subscripts identify the particular subcarrier cycle from which the sample is derived. Since the bandwidth of the color signals (B-Y), (R-Y) is considerably less than the carrier frequency, the (B-Y) and (R-Y) signals may be reconstructed with less than all the PCM chrominance samples. For example a (B-Y) demodulated signal may be generated from the separated chrominance signal by demultiplexing the $+(B-Y)$ samples only, and similarly a demodulated (R-Y) signal can be produced by demultiplexing the $+(R-Y)$, samples only.

It will be recalled that the chrominance carrier is 180 degrees out of phase from scan line to scan line. Thus, for an NTSC system where the subcarrier $F_{sc}$ is 3.58 MHz and the sample rate is $4F_{sc}$, the $+(B-Y)$ samples, and similarly the $+(R-Y)$ samples, are displaced by 140 ns line-to-line. The present inventor has determined that this 140 ns offset gives rise to a fine dot crawl along vertical edges, that is, vertical edges appear to be serrated with the serration creeping upward on the display.

Accordingly, it is an object of the present invention to provide means to demodulate the chrominance signal by simple demultiplexing while not introducing the fine dot crawl.

SUMMARY OF THE INVENTION

The present invention is a color signal demodulator in a TV receiver for demodulating a sampled data chrominance signal including sequences of alternating color mixture signals of the form $+A_n$, $+B_n$, $-A_n$, $-B_n$, with corresponding samples on adjacent lines being of opposite polarity. An A signal demodulator demultiplexes A signal samples, of one polarity only, from each sequence or multiple of sequences on every other line and demultiplexes and complements (inverts) temporally aligned A signal samples of opposite polarity from corresponding sequences on intervening lines.

BRIEF DESCRIPTION OF THE DRAWINGS

FIG. 3 illustrates in block diagram form a portion of a digital television receiver including a I/Q demodulator constructed in accordance with the present invention;

Referring to FIG. 1, the well known phase relationship of the color components of an NTSC video signal is illustrated. From the figure it will be noted that the (R-Y) and (B-Y) color mixture signals have a 90 degree phase differential with the $-(B-Y)$ and $+(B-Y)$ components being in phase and 180 degrees out of phase with the color burst signal, respectively. If the chrominance signal which includes the (B-Y) and (R-Y) color mixture signals is sampled in phase with burst, the $-(B-Y)$ signal can be extracted from the chrominance signal to produce a demodulated $-(B-Y)$ signal. If the samples are taken once per subcarrier period, the $-(B-Y)$ signals will contain all the information necessary to reconstruct the (B-Y) color difference signal. Similarly, by sampling the chrominance signal 90 degrees out of phase with burst, the (R-Y) color mixture signals may be demodulated from the chrominance signal.

It has been found that due to the peculiar response characteristics of the eye, color mixture signal bandwidth can be conserved by employing color mixture signals other than (R-Y) and (B-Y). To this end, the I signal having a base bandwidth of 1.5 MHz and the Q signal having a base bandwidth of 0.5 MHz are generally transmitted. The I and Q siqnals are comprised of components of the R, B and Y signals such that the I vector is located 57 degrees from burst and the Q vector is 147 degrees from burst. The I and Q color mixture signals may be demodulated from the chrominance signal by sampling the chrominance signal at 57 degrees and 147 degrees from burst, respectively.

Figure 1:
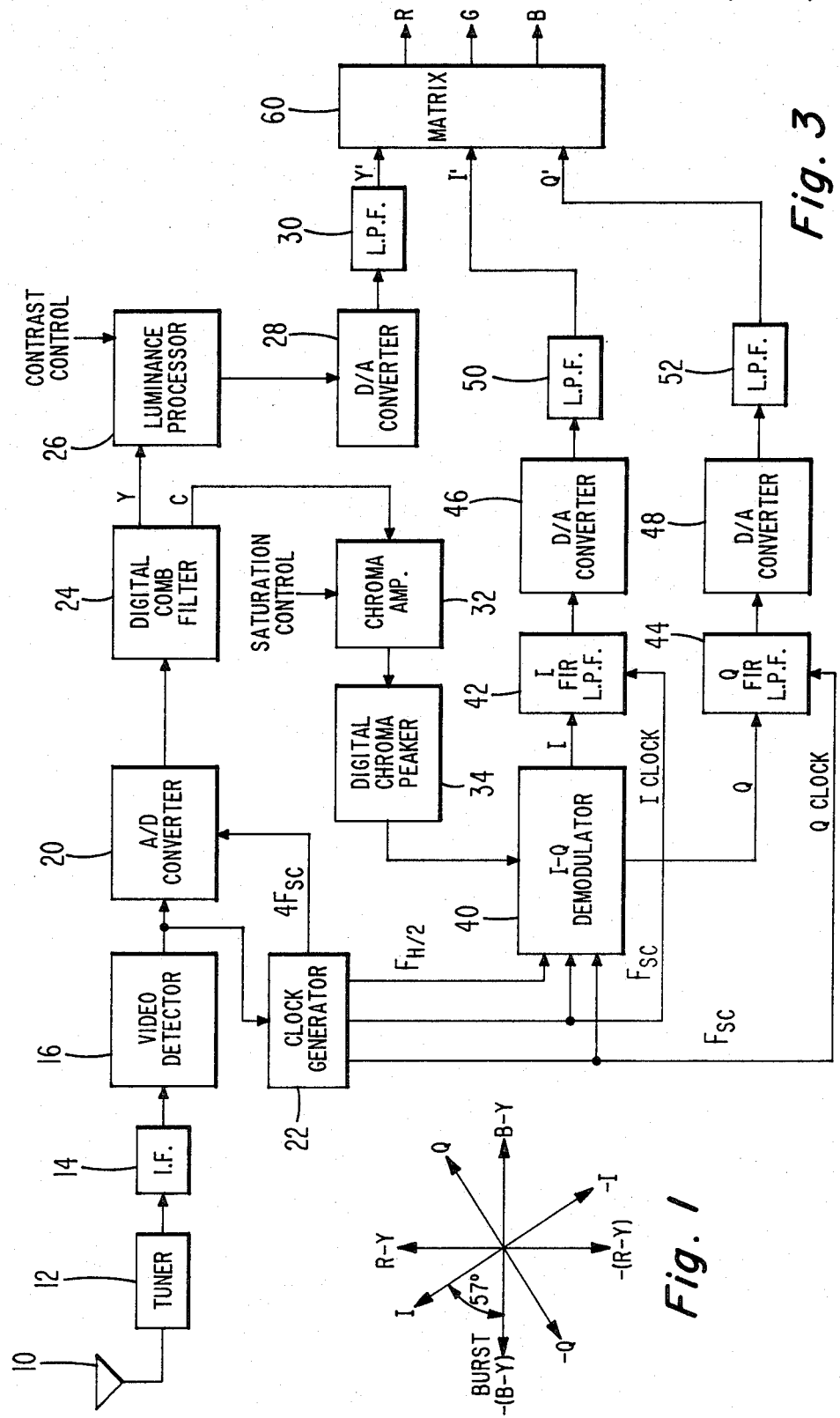
FIG. 1 is a vector diagram of the phase relationship of the color components of an NTSC video signal.
Figure 2:
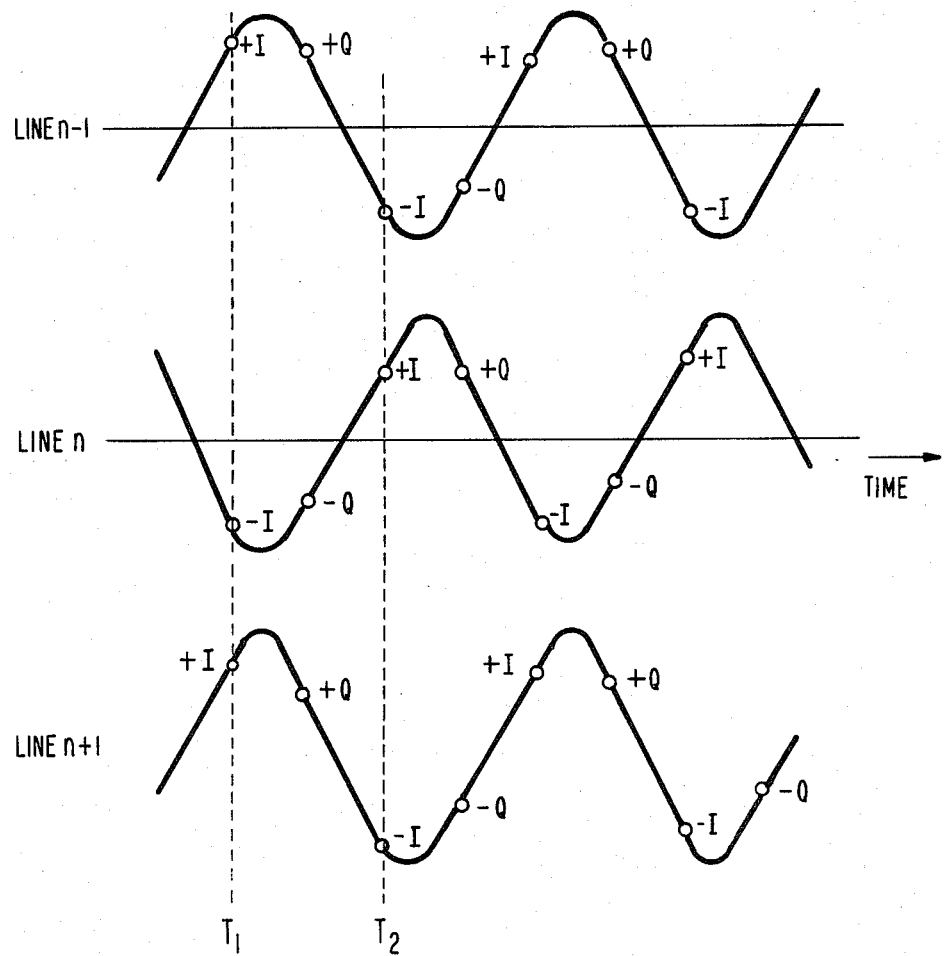
FIG. 2 is a graphical illustration of the amplitude versus time waveforms of portions of three scan lines of an NTSC signal showing sampling points at a $4F_{sc}$ rate.

FIG. 2 shows the general relationship of the color subcarrier between three successive lines. From line to line the phase of the subcarrier is displaced by 180 degrees. The small circles on the waveforms indicate sampling points at four times the subcarrier frequency phase locked to burst along the I and Q color mixture signal axes. It is seen that +I or +Q samples on one line are in time coincidence with the −I or −Q samples on adjacent lines. Nominally, the +I and −I samples within one period of the subcarrier signal contain the same information. Thus, it would appear that to recover (i.e., demodulate) the I color mixture signal, all that should be required is to selectively extract the +I or the −I signals from the +I, +Q, −I, −Q sampled data stream. To a first order approximation this is true. However, at large color transitions such as red to green vertical stripes which occur between e.g., +I and −I sampling points, the +I and −I samples will contain different information. In addition, since the PCM samples are determined with limited resolution and are nominally processed with limited resolution, truncation errors are added to the samples. When the +I, −I sample differences are compounded by the truncation errors, the total +I, −I signal differences are no longer insignificant. Consider that the image represented by the FIG. 2 signals includes a vertical edge between the I sampling points $T_1$ and $T_2$. Obviously, the +I sample taken at time $T_2$ on line n will differ from the +I sample taken at time $T_1$ on line n+1 or line n−1. Yet when the image is reconstructed on the kinescope, the signals at time $T_1$ from lines n+1 and n−1 will be substantially aligned with the signal sample at time $T_2$ from line n. It can readily be appreciated that the reconstructed vertical edge will appear ragged. The foregoing example is of course exaggerated because bandwidth limitations of the signal preclude large signal transitions occurring during one subcarrier cycle and thus the ragged edge effect will not be pronounced. However, on close examination of the displayed edge there will be a fine dot crawl associated with the edge. For high definition displays, it is desirable to eliminate this fine dot crawl.

The dot crawl will not occur if both the +I and −I samples are used to reconstruct the I color mixture signal. However, this requires processing the signal at a $2F_{sc}$ rate which in the context of a consumer digital TV receiver, undesirably increases the complexity of the overall circuitry. The present inventor has determined that the color mixture signals may be demodulated at the $F_{sc}$ rate if the +I,+Q samples are selected from every other line and the −I,−Q samples are selected and oomplemented from the intervening lines. In this manner the selected I,Q samples from adjacent lines are in temporal alignment, precluding the introduction of the fine dot crawl.

FIG. 3 illustrates a portion of a TV receiver including an I,Q color mixture signal demodulator 40. In FIG. 3, a television signal is received by an antenna 10 and successively processed by a tuner 12, intermediate frequency circuits 14, and a video detector 16, which are constructed in a conventional manner. The detected video signal at the output of the detector 16 is applied to the input of an analog to digital (A/D) converter 20. The A/D converter 20 samples the video signal at a rate equal to four times the color subcarrier frequency ($4f_{sc}$), and produces digital samples of the video signal at this rate. Each digital sample, or word, may comprise, for example, eight bits produced in parallel. In an eight-bit system, the analog video signal will be quantized to one of two-hundred and fifty-six discrete levels. The $4F_{sc}$ sampling clock for the A/D converter 20 is developed by a clock generator 22, which produces the sampling signal phase locked with the color burst signal of the analog video signal.

The digitized video signal produced by the A/D converter 20 is applied to an input of a digital comb filter 24. The comb filter 24 produces a separated luminance signal, Y, which is applied to a luminance signal processor 26. The luminance processor 26 is responsive to a viewer controlled contrast control signal and produces a processed luminance signal, which is applied to the inputs of a digital to analog (D/A) converter 28. The luminance signal, now in analog form, is filtered by a lowpass filter 30 to remove sampling frequency components, and a processed luminance signal Y' is applied to one input of a matrix arrangement 60.

The comb filter 24 also produces a separated chrominance signal C, which is applied to the input of a chroma amplifier 32. The chroma amplifier 32 amplifies the chrominance signal in response to a viewer controlled color saturation control signal, and applies the amplified chrominance signal to the input of a digital chroma peaker 34. The chroma peaker 34 is a digital filter which modifies the response characteristic exhibited by the chrominance signal at this point to compensate for the response characteristic of the intermediate frequency circuits 14.

The peaked chrominance signals are then applied to an input of an I-Q demodulator 40. The I-Q demodulator demodulates the chrominance signal into its baseband I and Q signal components. The demodulated I signal is applied to an input of an I finite impulse response (FIR) filter 42, and the demodulated Q signal is applied to an input of a Q FIR filter 44. The I filter has a passband extending from zero to approximately 1.5 MHz, and the Q filter has a passband extending from zero to 0.5 MHz. The I and Q filters remove high frequency noise contained in the color signals by reason of the broad bandwidth of the preceding processing circuitry.

The filtered I and Q signals are converted to analog signals by D/A converters 46 and 48, respectively, and the analog signals are then filtered by lowpass filters 50 and 52 to remove sampling frequency components. The resultant I' and Q' signals are applied to the matrix arrangement 60, where they are matrixed with the Y' signal to produce R, G and B output signals. The matrix arrangement may comprise, for example, a resistive signal combining matrix.

Figure 4:
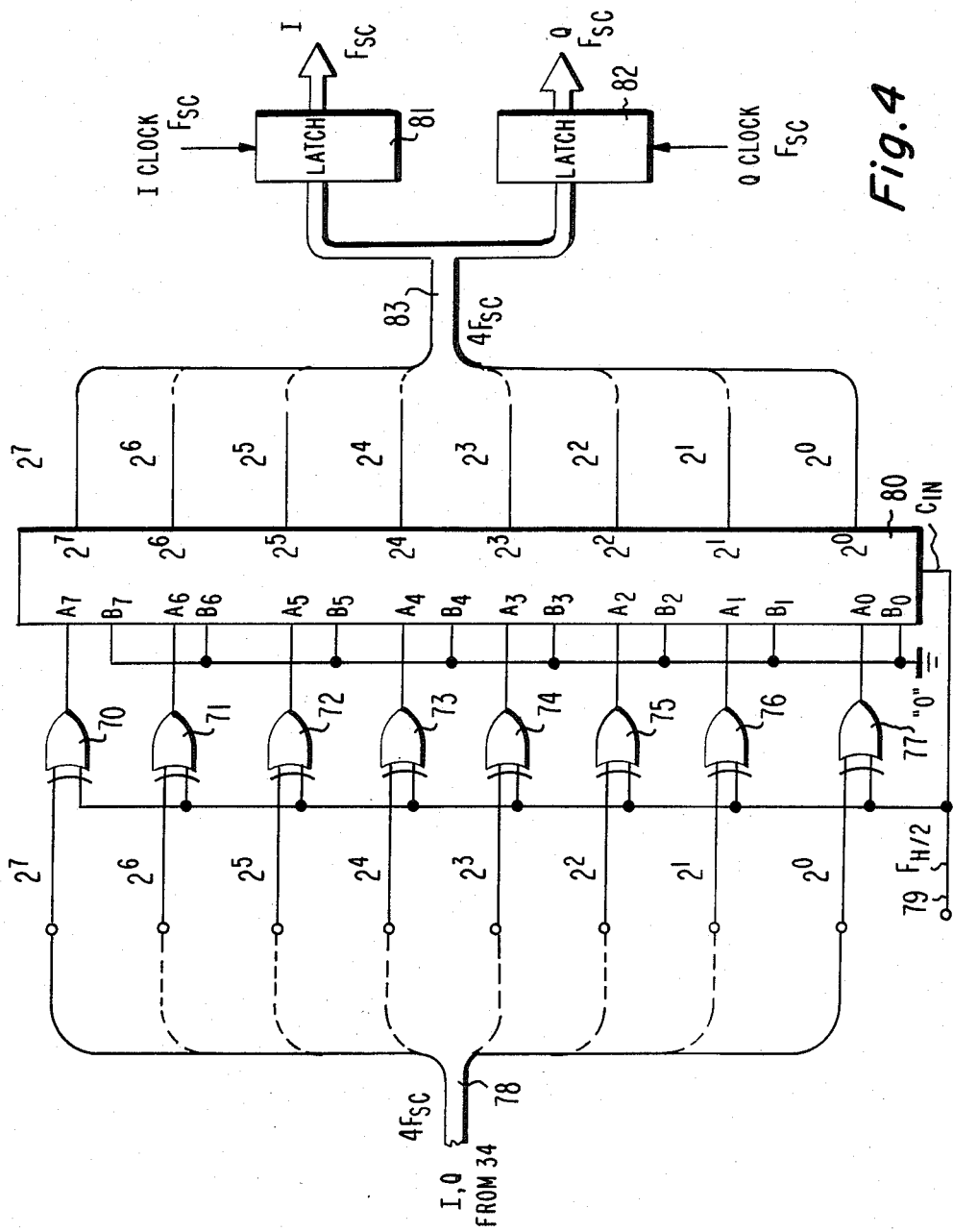
FIG. 4 is a block diagram of a digital demodulator embodying the present invention.

FIG. 4 shows in detail the elements of the demodulator 40. The demodulator includes the cascade arrangement of a two's complementor and a set of latch circuits for time division demultiplexing the I and Q signal samples, respectively. The two's complementer includes an 8 bit adder 80 with a carry in (Cin) terminal and 8 sets of input bit lines $A_n$ and $B_n$. One input bit line ($B_n$) from each of the 8 sets is connected to a logical zero potential (signal ground). The other input bit line ($A_n$) are respectively connected to the output terminals of 8 two-input exclusive OR (XOR) gates 70–77. One input of each of the XOR gates 70–77 is connected to the Cin terminal of the adder while the second input of each of the XOR gates is coupled to respective signal bit lines 78 from the digital peaker 34. The signal bit lines 78 are coupled via XOR gates 70–77 to the corresponding bit position in the adder 80, e.g. the most significant signal bit line ($2^7$) is coupled to the most significant bit input (A7) etc. The carry-in terminal is coupled to a clock sign $F_{H/2}$ which is a square wave having a two horizontal scan line period and substantially phase locked with the horizontal sync pulses of the composite video signal. The clock signal $F_{H/2}$ is therefore at a logic one potential during every other scan line and at logic zero potential during intervening scan lines.

The XOR gates 70–77 operate to invert the respective signal sample bits when clock $F_{H/2}$ is a logic one, and to simply pass, unaltered, the signal sample bits when $F_{H/2}$ is a logic low. The adder 80 will increment by one, the binary numbers representing each signal sample whenever $F_{H/2}$ is a logic one. When $F_{H/2}$ is a logic low, adder 80 will pass the binary numbers unaltered. Thus, each signal sample applied to bit lines 78 is translated unaltered to the adder output bit lines 83 whenever clock signal $F_{H/2}$ is a logic zero. On the other hand, each signal sample is inverted and incremented by one (i.e., two's complemented) whenever clock signal $F_{H/2}$ is high. Since clock signal $F_{H/2}$ is phase locked with horizontal sync, all of the signal samples on alternate lines are two's complemented. (The foregoing assumes the signal to be in two's complement form. The signal samples can be one's complemented, if desired, simply by omitting the adder circuit 80.)

The output connection 83 of adder 80 is coupled in parallel to two 8 bit latch circuits 81 and 82. Latches 81 and 82 are controlled by signals $I_{clock}$ and $Q_{clock}$ to respectively successively latch and hold every fourth signal sample. The $I_{clock}$ coincides with the positive (negative) I signal samples on even scan lines and to coincide with negative (positive) I signal samples on odd scan lines. The output of latch 81 is a demodulated I color mixture signal occurring at the $F_{sc}$ sample rate.

Similarly, the $Q_{clock}$ controls latch 82 to successively latch +Q and −Q signal samples on alternate scan lines to produce a demodulated Q color mixture signal.

Figure 5:
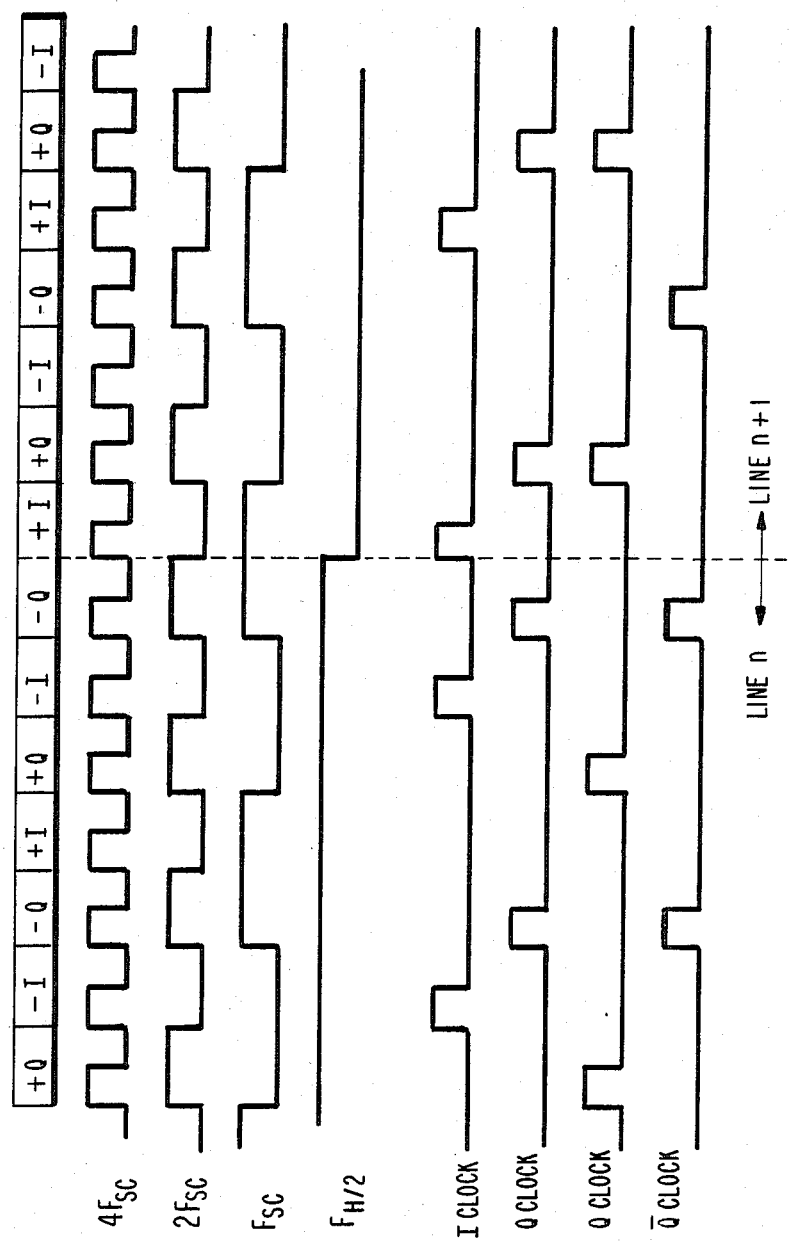
FIG. 5 is a timing diagram showing the interrelationship of various clock signals required by the FIGS. 1, 4 and 5 circuits.

FIG. 5 shows the phase relationship of the required clocking signals. In FIG. 5, assume the $4F_{sc}$ waveform is phase locked with burst and aligned so that the positive going edge of each cycle coincides with requisite sampling points to produce the quadrature related color mixture signal samples +I, −I, +Q and −Q. Successive video samples of the sampled analog input signal will be of the form (Y+Q), (Y−I), (Y−Q), (Y+I), (Y+Q), etc. The sampled I,Q data stream in FIG. 5 is presumed to have had the Y component removed by comb filtering. The vertical broken line in the center of the Figure indicates the temporal juncture between adjacent lines. To the left of the broken line the $I_{clock}$ pulses are seen to coincide with −I samples and to the right of the broken line the $I_{clock}$ pulses coincide with the +I samples. Similarly, to the left and right of the broken line, the $Q_{clock}$ coincides with −Q and +Q samples, respectively.

While the $F_{H/2}$ clock signal transition is shown precisely at the interline demarcation, this is not a strict requirement since the video signal at both extremities of each scan line usually does not contribute to the displayed image. The $F_{H/2}$ transition need only to have occurred prior to the portion of each line which will actually be displayed.

Figure 6:
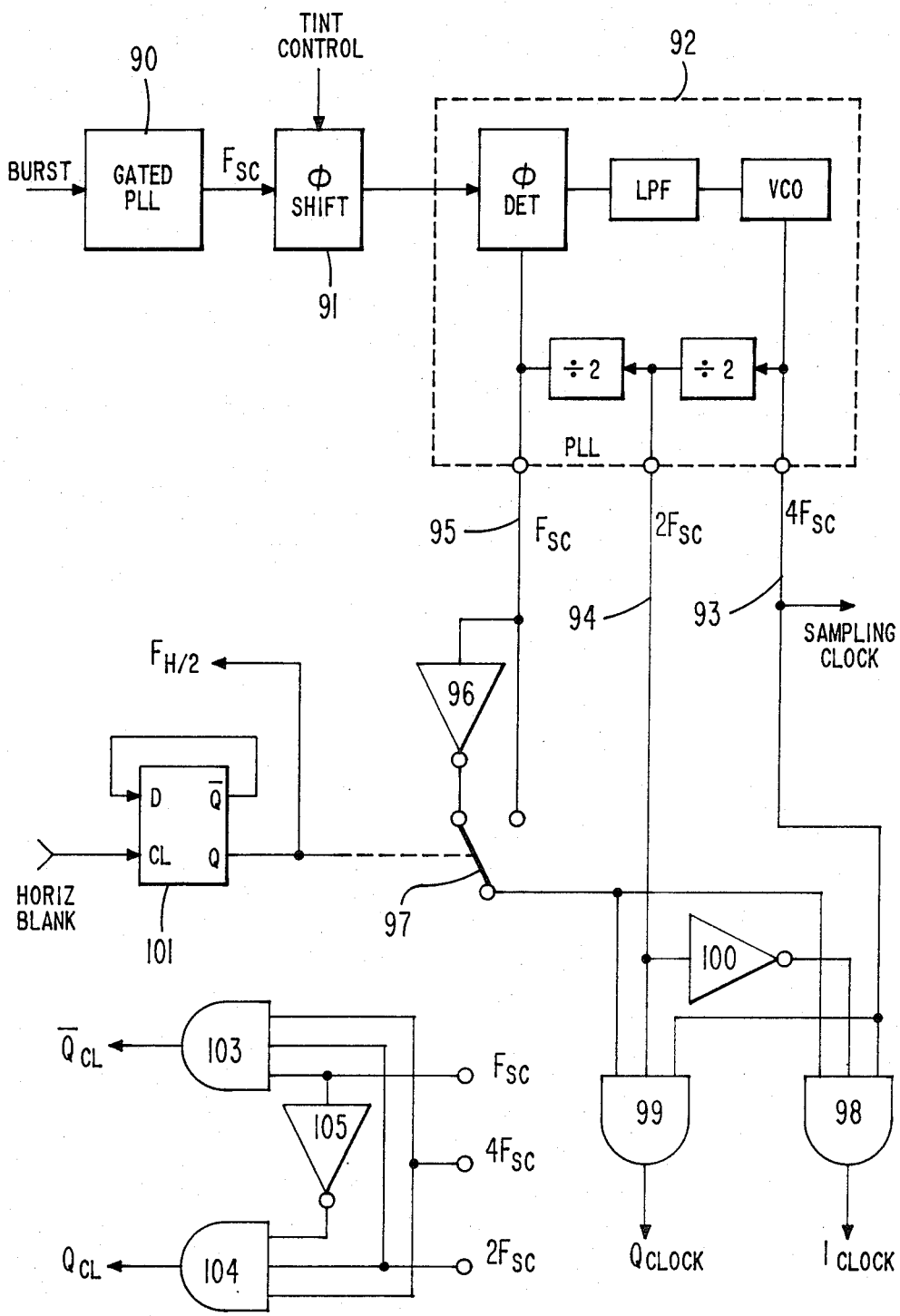
FIG. 6 is a block diagram of circuitry for generating the clock signals of FIG. 6.

FIG. 6 illustrates representative circuitry encompassed in element 22 for generating the clock waveforms shown in FIG. 5. In the Figure, element 90 is a phase locked loop responsive to the burst signal for generating a continuous signal at the burst frequency $F_{sc}$ and phase locked to burst. The output signal from element 90 is applied to a phase shifting circuit 91 which may be responsive to user control to adjust the tint of the displayed image. See for example, U.S. Pat. No. 3,806,794 entitled "Phase Shifter with Single Potentiometer Control" for the disclosure of a suitable phase shifter circuit. Phase shifter 91 produces an output signal of frequency $F_{sc}$ which is phase locked with the burst signal but having a phase relationship therewith which determines the color axis along which the sampling clock samples the analog signal to produce the desired color mixture signal samples.

The $F_{sc}$ signal from element 91 is applied to a second phase locked loop 92 which provides output signals at one, two and four times $F_{sc}$. The $4F_{sc}$ signal is utilized as the sampling clock which is applied to the A/D converter 20. In addition, the $4F_{sc}$ signal, along with the $2F_{sc}$ and $F_{sc}$ signals are applied to gates 98, 99 and 100 to produce the $I_{clock}$ signal and the $Q_{clock}$ signals illustrated in FIG. 5. The $I_{clock}$ and $Q_{clock}$ signals are shifted 180 degrees with respect to burst from line to line. This shift is accomplished by inverting the $F_{sc}$ signal applied to gates 98 and 99 from line to line. Since the $F_{sc}$ signal is at the burst rate, inverting or complementing the $F_{sc}$ signal effects a 180 degree shift of the $F_{sc}$ signal relative to burst. In FIG. 6, the $F_{sc}$ signal or its complement is alternately applied at the line rate to gates 98 and 99 via the switch 97. Switch 97 is controlled by a D-type flip flop 101 which is connected as a divide-by-two circuit and is responsive to unidirectional transitions of the horizontal sync pulses from the video signal. When $F_{H/2}$ is a logic high, switch 97 couples the $F_{sc}$ inverter 96 to gates 98 and 99, and when $F_{H/2}$ is a logic low, switch 97 couples $F_{sc}$ directly to gates 98 and 99.

The output signal $F_{H/2}$ from D-type flip flop 101 is at one half the scan line rate and is applied to the Cin terminal 79 of the FIG. 4 complementing circuit. Since the $F_{H/2}$ signal controls both the complementing circuit and the I clock and Q clock phases, the output signals from latches 81 and 82 will always be of single polarity.

The additional gates 103, 104 and 105 shown in FIG. 6 generate clock pulses $Q_{CL}$ and $\overline{Q}_{CL}$ (shown in FIG. 5) from the $F_{sc}$, $2F_{sc}$ and $4F_{sc}$ signals from PLL 92. The $Q_{CL}$ and $\overline{Q}_{CL}$ signals are utilized in the FIG. 7 circuit described below.

Figure 7:
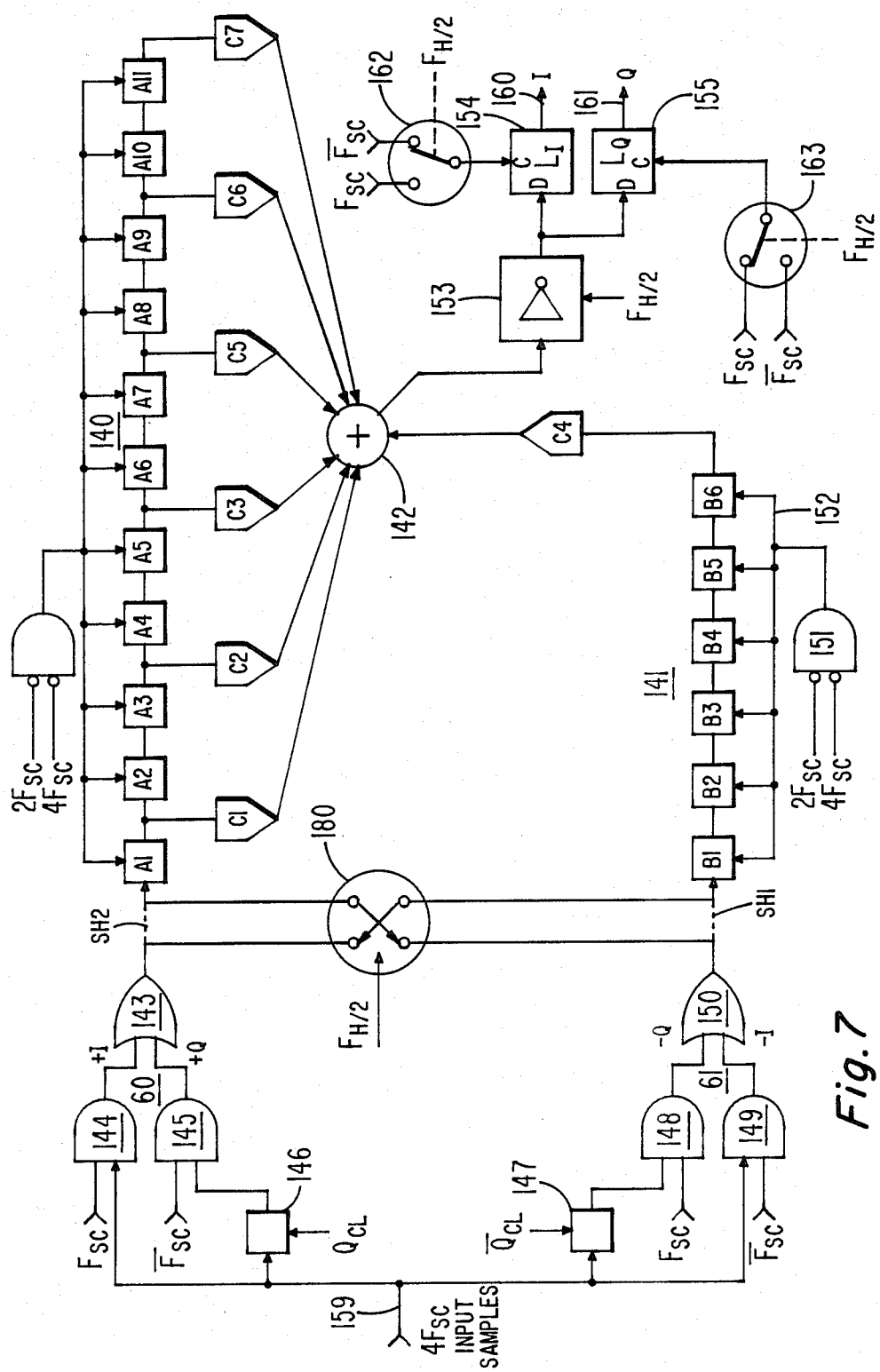
FIG. 7 is a block diagram of a decimating filter-demodulator circuit which accepts signal samples at a first rate and produces demodulated filtered signals at a lower rate.

The FIG. 7 circuit is a FIR filter demodulator which may be substituted for both FIR filters 42 and 44 and demodulator 40 in the FIG. 3 circuit. The FIG. 7 circuit subjects both the I and Q signal samples to the same frequency response transfer characteristic. It receives the ±I and Q signals at the $4F_{sc}$ sample rate at its input terminal 159 and produces demodulated I and Q filtered samples at a $F_{sc}$ sample rate at output terminals 160 and 161, respectively. The FIG. 7 filter is generally of the output weighted type but incorporates two parallel registers enabling it to process signal samples at a one half the input sample rate. A detailed description of this type of FIR filter can be found in U.S. patent application Ser. No. 405,173, filed Aug. 4, 1982, entitled "Decimating and Demodulating FIR Filters as for TV Chroma Signals" (incorporated herein by reference) now abandoned.

In the filter of the above identified patent application, the cross point switch 180 is not incorporated, and a gate corresponding to OR gate 143 is directly connected to register stage A1, and a gate corresponding to OR gate 150 is directly connected to register stage B1 indicated by the dashed lines SH2 and SH1, respectively. In addition, the complementing circuit 153 is not included and the output of adder 152 is directly connected to the D input of latch 154. In this configuration, this filter produces either +I and +Q filtered samples or −I and −Q filtered samples, and operates as follows. A gating circuit comprised of latch 146, AND gates 144,145 and OR gate 143 successively directs the +I and +Q samples to N stage tapped delay line 140 including stages A1-A11 which is clocked at a $2F_{sc}$ rate. A second gating circuit comprised of latch 147, AND gates 149,148 and OR gate 150 successively directs the −I and −Q input samples to M stage tapped delay line 141 including stages B1-B6 which is also clocked at the $2F_{sc}$ rate. Weighting circuits C1-C7 are coupled to selected output taps of the delay line 140 and 141 to weight the signal samples at the respective taps. The weighted samples are all summed in the ADDER 142 which produces filtered replicas of the input samples at a $2F_{sc}$ rate. The filter transfer function is determined by the location of the connections of the respective weighting circuits to the delay lines and the coefficient values of the weighting circuits. It will readily be appreciated that since the registers are clocked at $2F_{sc}$, the ADDER 142 can only produce filtered samples at $2F_{sc}$, thus, the filter inherently decimates the input sample stream by a factor of two.

The output filtered sample stream from ADDER 142 includes only +I and +Q filtered replicas of the input signal. These filtered samples are applied to latches 154 and 155 which selectively apply the +I samples to output terminal 160, and the +Q samples to output terminal 161.

Since the filter normally produces only +I and +Q samples, it is susceptible of generating fine dot crawl along vertical color transitions. This shortcomming is corrected in the FIG. 7 filter by alternately directing the +I, +Q and (−)I, (−)Q samples between delay lines 140 and 141 at the line rate. This is accomplished via the cross point switch 180 which is controlled by the $F_{H/2}$ clock signal. During every other line period OR gate 143 (150) is coupled to delay line stage A1 (B1) and during intervening lines OR gate 143 (150) is coupled to delay line stage B1 (A1). As a result, ADDER 142 produces filtered samples of one polarity on every other line, and filtered samples of opposite polarity on intervening line. To maintain the sense of the filtered samples constant at output terminals 160 and 161, a complementing circuit 153 is interposed between ADDER 142 and latches 154 and 155. Complementing circuit 153, which may be similar to the one described with reference to FIG. 4, is synchronously controlled with switch 180 by the clock signal $F_{H/2}$ to complement the filtered samples from ADDER 142 on alternate lines.

Because a +Q sample is normally applied to register 140 with a −I sample being concurrently applied to register 141 and +I and −Q samples are applied concurrently to registers 140 and 141, respectively, the filtered samples at the output of ADDER 142 undergoe a 180° positional displacement. It is therefore necessary to change the phase of the clocks to latches 154 and 155 from line-to-line. This is accomplished by switches 162 and 163 which are controlled by the $F_{H/2}$ signal to alternate the phase of the latch clocks on a line-to-line basis. When +I,+Q samples are directed to register 140, clock signals $\overline{F}_{sc}$ and $F_{sc}$ are respectively coupled to latches 154 and 155. When −I,−Q signals are applied to register 140, clock signals $F_{sc}$ and $\overline{F}_{sc}$ are respectively coupled to latches 154 and 155.

What is claimed is:

1. In a TV receiver having a source of sampled data chrominance signal, said chrominance samples occurring in sequences of interleaved first and second color mixture signals +A, +B, −A, −B, where the ± signs accompanying samples designated with like letters indicate a difference of sampling phase of 180 degrees relative to a color burst reference and samples separated by exactly one horizontal line interval are sampled on opposite phases, a demodulator comprising:
    means for selectively demultiplexing samples of a first color mixture signal component sampled at a prescribed sampling phase from every other horizontal line of chrominance signal and demultiplexing and inverting the polarity of samples of said color mixture signal component sampled at 180 degree phase differences relative to said prescribed sampling phase from the intervening horizontal lines of chrominance signal.

2. In a television receiver including a source of sampled data chrominance signals formatted in sequences of color mixture signals where the sequences occur at the color subcarrier rate and successive samples in each sequence are of the form +A +B, −A, −B, and including a source of horizontal sync signals, a demodulator comprising:
    means responsive to said horizontal sync signals for generating a first clock signal;
    inverting means having an input coupled to said source of sampled data chrominance signals and having an output terminal, said inverting means being responsive to said first clock signal for selectively inverting the signal samples during predetermined periods; and
    means, responsive to the chrominance signal samples from the output terminal of said inverting means, for demultiplexing signal samples of one of the color mixture signal components at corresponding instances of time on adjacent horizontal lines.

3. The demodulator set forth in claim 2 wherein the means for demultiplexing the color mixture signal samples comprises:
    means responsive to the first clock signal for generating a second clock signal phase locked with signal samples from said source and during said predetermined periods being in phase with signal samples of one of said color mixture signal components designated with one sign and otherwise being in phase with signal samples of said one of said color mixture signal components designated with the opposite sign; and
    a clocked storage element responsive to said second clock signal and coupled to the output terminal of said inverting means; and
    said storage element being clocked to latch signal samples of said one color mixture component being temporally aligned from period to period.

4. In a video signal processing system for processing composite video signals including a burst reference signal and horizontal sync signals, a demodulator circuit for demodulating color mixture signals of a chrominance component of the composite signal comprising:
    a terminal for applying said chrominance signal;
    means responsive to said horizontal sync signals for generating first a clock signal;
    means responsive to said burst signal for generating a second clock signal phase locked with said burst signal and in a predetermined phase relationship therewith, and responsive to said first clock signal for altering the predetermined phase relationship 180 degrees relative to the burst signal; and sampling means responsive to said second clock signal for sampling said chrominance signal, and producing a demodulated color mixture signal at an output terminal thereof.

5. The demodulator circuit set forth in claim 4, further including:

an inverting circuit responsive to said chrominance signal and said first clock signal for inverting the polarity of said chrominance signal during predetermined line periods.

6. The demodulating circuit set forth in claim 5 wherein the chrominance signal is in binary sampled data signal format and the inverting circuit is a binary complementing circuit.

7. The demodulator set forth in claim 6 wherein the binary complementing circuit comprises:

n two-input exclusive OR circuits, n being the number of bit positions in said binary samples, each exclusive OR circuit having an output terminal, a first input coupled to said first clock signal and each having a second input coupled to receive respective bits of said binary chrominance signal;

an n-bit binary ADDER having n first input terminals and n second input terminals, a carry-in input terminal, and an n-bit output terminal;

means for connecting said n second input terminals to a logic zero potential;

respective means for connecting the n first input terminals to respective ones of the n exclusive OR output terminals; and means for connecting said carry-in input terminal to said first clock signal so that the ADDER circuit increments by one, the binary number represented by the output signals of the n exclusive OR gates when the first clock signal is a logic high, and passes unaltered the binary number represented by the output signals of the n exclusive OR gates when the first clock signal is a logic low.

8. The demodulator set forth in claim 7 wherein the sampling means comprises an n-parallel bit clocked storage device coupled to the output of the ADDER circuit and operatively controlled by said second clock signal.

9. The demodulator set forth in claim 6 wherein the binary complementing circuit comprises:

n two-input exclusive OR circuits, n being the number of bit positions in said binary samples, each exclusive OR circuit having an output terminal, a first input coupled to said first clock signal and a second input respectively coupled to receive respective bits of said binary color mixture signal;

an n-bit binary ADDER having n first and n second input terminals, a carry-in input terminal and an n-bit output terminal;

means for connecting the n second input terminals to a logic zero signal;

respective means for connecting the n first input terminals to respective ones of the n exclusive OR output terminals; and means for connecting the carry-in input terminal to receive said first clock signal.

10. The demodulator set forth in claim 9 wherein the sampling means comprises an n-parallel bit binary storage element operatively controlled by said second clock signal and having an input connection for coupling the chrominance signal thereto and an n-bit output connection coupled to the second inputs of said n exclusive OR circuits.

11. The demodulator circuit set forth in claim 4 further including:

an inverting circuit responsive to said demodulated color mixture signal and said first clock signal for inverting the polarity of said demodulated color mixture signal during predetermined line periods.

12. The demodulator circuit set forth in claim 11 wherein the color mixture signal is in binary sampled data signal format and the inverting circuit is a binary complementing circuit.

* * * * *

UNITED STATES PATENT AND TRADEMARK OFFICE
CERTIFICATE OF CORRECTION

PATENT NO. : 4,527,188
DATED : Jul. 2, 1985
INVENTOR(S) : Henry G. Lewis, Jr.

It is certified that error appears in the above-identified patent and that said Letters Patent is hereby corrected as shown below:

Column 3, line 42    "+1" should be --+I--.

Column 3, line 51    "oomplemented" should be --complemented--.

Signed and Sealed this

Nineteenth Day of November 1985

[SEAL]

Attest:

Attesting Officer

DONALD J. QUIGG

Commissioner of Patents and Trademarks